United States Patent [19]

Yashiro

[11] Patent Number: 5,789,138
[45] Date of Patent: Aug. 4, 1998

[54] OPTICAL RECORDING MEDIUM AND METHOD OF PRODUCING THE SAME

[75] Inventor: Toru Yashiro, Yokosuka, Japan

[73] Assignee: Ricoh Company, Ltd., Tokyo, Japan

[21] Appl. No.: 754,015

[22] Filed: Nov. 20, 1996

Related U.S. Application Data

[63] Continuation of Ser. No. 609,418, Mar. 1, 1996, abandoned, which is a continuation of Ser. No. 276,106, Jul. 15, 1994, abandoned.

[30] Foreign Application Priority Data

Jul. 19, 1993 [JP] Japan .................. 5-200011

[51] Int. Cl.$^6$ .................. G11B 7/24; G11B 7/26
[52] U.S. Cl. .................. 430/270.16; 430/945; 427/162
[58] Field of Search .................. 430/270.16, 945; 427/162, 164; 428/64.4

[56] References Cited

U.S. PATENT DOCUMENTS

| | | | |
|---|---|---|---|
| 3,754,921 | 8/1973 | Riester et al. | 430/338 |
| 4,605,607 | 8/1986 | Nikles et al. | 430/17 |
| 5,169,745 | 12/1992 | Yashiro et al. | 430/495 |
| 5,238,722 | 8/1993 | Yashiro et al. | 428/64 |
| 5,242,730 | 9/1993 | Yashiro et al. | 428/64 |
| 5,252,372 | 10/1993 | Yashiro et al. | 428/64 |
| 5,268,478 | 12/1993 | Kawaguchi et al. | 544/225 |
| 5,281,512 | 1/1994 | Kobayashi et al. | 430/495 |

FOREIGN PATENT DOCUMENTS

| | | |
|---|---|---|
| 59-067093 | 4/1984 | Japan . |
| 63-045362 | 2/1988 | Japan . |
| 63-127447 | 5/1988 | Japan . |
| 63-129540 | 6/1988 | Japan . |
| 4-339865 | 11/1992 | Japan . |

*Primary Examiner*—John A. McPherson
*Attorney, Agent, or Firm*—Cooper & Dunham LLP

[57] ABSTRACT

An optical recording medium is composed of a substrate and a light absorbing layer serving as recording layer formed on the substrate. The light absorbing layer includes a phthalocyanine compound and a compound having a group which can be coordinated to the phthalocyanine compound.

6 Claims, 1 Drawing Sheet

OPTICAL RECORDING MEDIUM AND METHOD OF PRODUCING THE SAME

This is a continuation of application Ser. No. 609,418, filed Mar. 1, 1996, now abandoned, which is a continuation of application Ser. No. 276,106, filed Jul. 15, 1994, now abandoned.

FIELD OF THE INVENTION

The present invention relates to an optical recording medium and a method of producing the optical recording medium.

DISCUSSION OF BACKGROUND

Recently overwrite type CDs (Compact Disks) have been actively developed. This is because the overwrite type CDs, unlike conventional CD, have the features that the user can record information therein as desired, and the recorded information can be reproduced therefrom by use of a commercially CD player since the signals recorded in the overwrite type CDs satisfy the conventional CD standards for signals for recording.

An example of such an overwrite type CD is proposed in Japanese Laid-Open Patent Application 2-42652. This overwrite type CD comprises a substrate, a light absorbing layer which is provided by the spin coating of a pigment on the substrate, and a metal reflection layer provided on the back side of the substrate opposite to the light absorbing layer.

Another example of such an overwrite type CD is proposed in Japanese Laid-Open Patent Application 2-132656. This overwrite type CD comprises a light absorbing layer comprising a pigment and is caused to satisfy the conventional CD standards for signals for recording by appropriately selecting the double refractive index and thickness of the light absorbing layer.

The overwrite type CDs using pigments as disclosed in Japanese Laid-Open Patent Applications 2-42652 and 2-132656, however, do not have a sufficient light resistance for use in practice. To be more specific, these overwrite type CDs have the shortcoming that the signal characteristics thereof change, when exposed to sun light for an extended period of time, to the extent that they cannot satisfy the conventional CD standards. This is because the properties of the dye materials used in the light absorbing layers thereof, in particular, conventional cyanine dyes, are changed when exposed to light.

In order to control such changes in the properties of the dye materials, it has been proposed to contain a light stabilizer in the light absorbing layer as disclosed in Japanese Laid-Open Patent Application 63-159090. However, when the content of the light stabilizer in the light absorbing layer is small, for instance, less than 20 wt. %, a sufficient light resistance for use in practice cannot be obtained, while when the content of the light stabilizer in the light absorbing layer is large, for instance, 20 wt. % or more, the optical and/or thermal characteristics of the light absorbing layer deteriorate.

As another means for improving the light resistance of the light absorbing layer, it is proposed that a phthalocyanine compound, which is a dye with high light resistance, be employed as a material for the light absorbing layer. However, it is difficult to obtain the optical characteristics required for the light absorbing layer, in particular, high refractive index, by use of such a phthalocyanine compound.

This is because the optical characteristics of the light absorbing layer depend upon the absorption coefficient of the layer (i.e. the absorbance per unit thickness of the layer) at a wavelength close to the wavelength of a laser beam for the reproduction of recording, so that there is required a sufficiently large absorption coefficient for satisfying the optical characteristics required for the overwrite type CD. However, a film layer of such a phthalocyanine compound has a absorption coefficient which is smaller than that of a film layer of the conventional cyanine dye. To be more specific, the absorption coefficient of the film layer of the phthalocyanine compound is about ⅓ to ½ the absorption coefficient of the film layer of the cyanine dye.

SUMMARY OF THE INVENTION

It is therefore a first object of the present invention to provide an optical recording medium comprising a light absorbing layer which comprises a phthalocyanine compound and has improved optical characteristics.

A second object of the present invention is to provide a method of producing the above-mentioned optical recording medium.

The first object of the present invention can be achieved by an optical recording medium which comprises a substrate and a light absorbing layer formed on the substrate, the light absorbing layer comprising a phthalocyanine compound (1) and a compound (2) having a group which can be coordinate to the phthalocyanine compound (1).

In the above, the compound (2) may be a compound having a group which contains at least one element selected from the group consisting of N, O and S.

Furthermore, in the above, the compound (2) may have a group which is selected from the group consisting of:

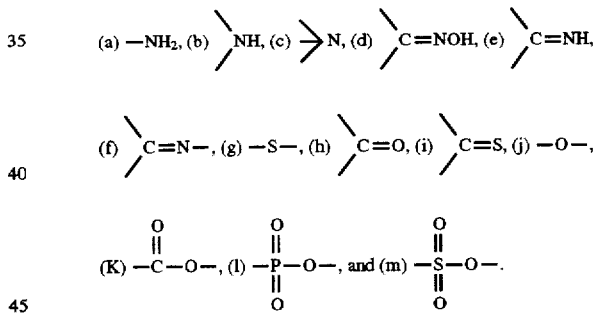

Furthermore, it is preferable that the compound (2) have a melting point of 150° C. or more.

In addition, it is preferable that the compound (1) be a compound which has a central metal ion with the number of the electrons in the d-orbit thereof being 1, 1, 2, 3, 4, 5, 6, 7, or 10 (such electrons being herein sometimes termed d-orbit electrons).

The second object of the present invention can be achieved by a method which comprises the step of performing spin coating of a mixture of a melted liquid of the above-mentioned compound (1) and the above-mentioned phthalocyanine compound (1) which is dissolved in the melted liquid of the compound (2) on the substrate.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
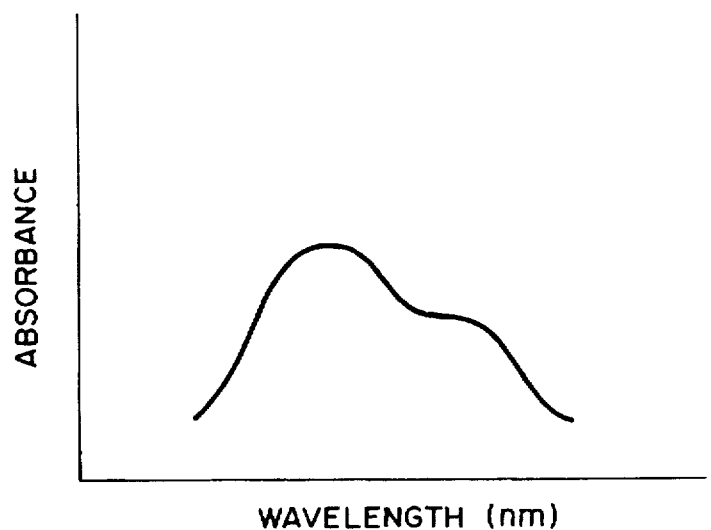
FIG. 1 is a light absorption spectrum of a phthalocyanine compound film in which the molecules thereof are associated.

The inventors of the present invention have completed the present invention based on the knowledge that the reasons why the absorption coefficient of a film layer of a phthalocyanine compound, serving as a light absorption layer, and therefore as a recording layer, used in the conventional optical recording medium is small are that the molecule of the phthalocyanine compound has a plane structure, so that the molecules of the phthalocyanine compound tend to be associated, and when the molecules of the phthalocyanine compound are associated, the light absorption spectrum of the phthalocyanine compound becomes broad because of the mutual interaction of the molecules as shown in FIG. 1.

According to the present invention, the above problem of the conventional optical recording medium has been solved by providing a light absorbing layer for an optical recording medium, which comprises as the main component a mixture of the phthalocyanine compound and a compound which inhibits the association of the molecules of the phthalocyanine compound.

Examples of the compound which inhibits the association of the molecules of the phthalocyanine compound are compounds having a group which can be coordinated to the phthalocyanine compound, more particularly, compounds having a group which contains at least one element selected from the group consisting of N, O and S.

Compounds containing any of the above-mentioned elements in the group thereof tend to be coordinated to the central metal element of the phthalocyanine compound, so that such compounds enter between the molecules of the phthalocyanine compound, thereby inhibiting the association of the phthalocyanine compound.

Examples of compounds having such association inhibition characteristics are compounds having at least one of the following groups because such compounds tend to be coordinated to the phthalocyanine compound and therefore effectively inhibit the association of the phthalocyanine compound:

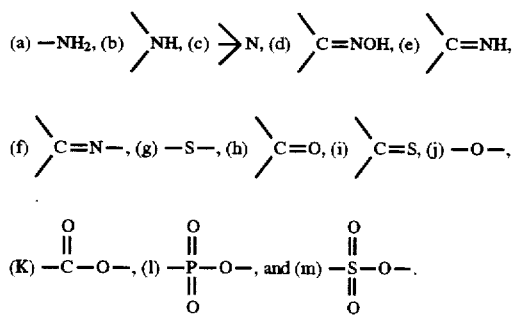

In order to maintain the thermal stability of the light absorption layer, it is preferably that the compounds having the group which can be coordinated to the phthalocyanine compound, which may be referred to as compounds having a donor element, have a melting point of 150° C. or more. This is because in the case where a compound having a donor element, with a melting point of less than 150° C., is employed in the light absorption layer, the characteristics of the light absorption layer, particularly the optical characteristics thereof, tend to be changed at high temperatures.

Specific examples of the compound having the above-mentioned characteristics suitable for use as the compounds having the group which can be coordinated to the phthalocyanine compound are as follows: acrylamide, o-aminobenzaldehyde, 2-aminobenzothiazole, acetylacetonate, acetylacetonate-F$_6$, N,N'-ethylenebis (acetylacetoneiminate), N,N'-ethylene-bis (trifluoroacetoneiminate), N,N'-propylene-bis (acetylacetoneiminate), N,N'-trimethylene-bis (acetylacetone-iminate), acetamide, acridine-N-oxide, 2,4,4-trimethyl-10,11-benzo-1,5-diaza-8,12-dithiacyclopentadeca-1,10-diene, 6-aminohexanoic acid, 8-amino-7-hydroxy-4-methylcourmarin, alaninate, L-alaninamide,

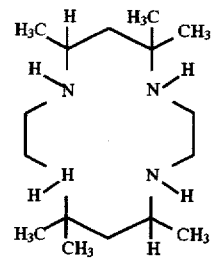

aniline, 2-(acetyl)picoline, 1-amino-2-(diphenylarsino)-ethane, 1-amino-2-(diphenylarsino oxide)ethane, N-amidino-S-ethyliourea, bis(2-diphenylarsinoethyl)amine, 2,2'-azopyridine, 8-dimethylarsinoquinoline, bis(2-diphenylarsinoethyl)sulfide, acetylthiocarbazide, aziridine, benzamide,

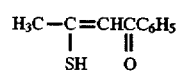

1,4-butylenebisdiphenylarsine oxide, 1,3-butanedione, 1,4-butylenebisdiphenylphosphine oxide, benzene-1,2-diamine,

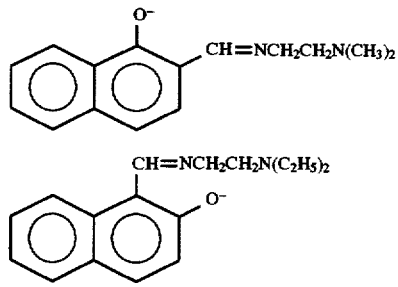

benzoylacetone, benzylamine, N-(2-benzothiazole)-2-pyridinaldimine, benzenethiolate, biguanide ethylenediamine, bis(hexafluoroacetylacetoneiminate) triethylenetetramine, 1,19-diethoxycarbonyl-2,3,7,8,12,13, 17,18-octamethyl-1,19-dideoxybilene-b, 2,2'-bipyridine, 2,2'-bipyridine N-oxide, bipyrazinyl

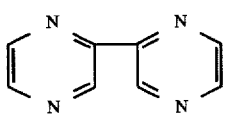

4(5)-bromoimidazole, 4(5)-bromoimidazole anion, biacetyl-bis-N-methylimine, 2,3-diaminobutane,

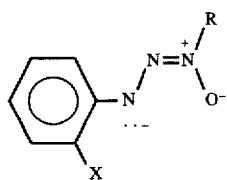

2,2'-bipyridylamine, 1-benzyl-2-phenylbenzimidazole, bipyrazinyl, bis(1-pyrazolyl)borate, 4-bromo-2-nitrosophenol, N,N'-|bis(salicylidene)|-bis(o-methylthioaniline), bis(trifluoroacetylacetoneiminate)-triethylenetetramine, benzoyltrifluoroacetonate, benzothiazole, benzimidazole, 1,3-diiminoisoinodoline, 1(2H)-phthalozinone, phthalhydrazide, phthalic anhydride, phthalimide, γ-butyrolactam, 4,4-dimethyl-1,3-penetanedione, 1-phenyl-t-butylamino-2-butylamino-2-propen-1-thione, N,N-di-n-butylthiocarbamate, benzyldiphenylphosphine, 1-phenyl-1,3-butanedione, 3-benzylacetylacetone, benzimidazoleanion, benzyl cyanide, benzimidazole, N-(2-benzothiazole)-2-pyridinalidime, [p-xylylenebis(triphenylphosphonium)]$^{2+}$, 4'-ethoxycarbonyl-3,3',4,5,5,-penetamethyldipyrromethene, tri-(2-cyanoethyl)phosphine, cyclohexane-1,2-dione 1-oxime, cholic acid,

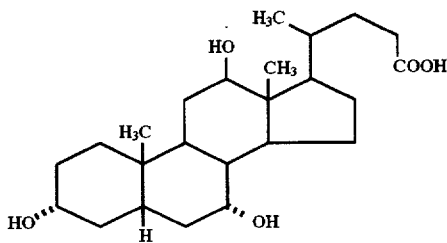

2-methoxy-4-formylphenol, N,N,N',N'-tetramethylpropylenediamine,

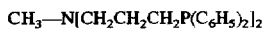

N,N'-bis(7-methyl-2-pyridylmethylene)-1,3-diaminobutane, (O,O'-diisopropyldithiophosphato) (RR)-(−)cyclohexane-1, 2-diamine citrate, m-chloroaniline, (2-chlorophenyl)-carbodiimide, (2,4,6-trichlorophenyl)carbodiimide, 2-chlorobenzoylthiocarbazide, 4-chloro-2-nitrosophenol

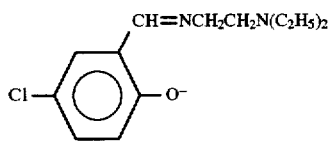

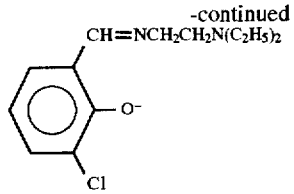

3-cycanoacetylacetone, 2,4,6-trimethylpyridine N-oxide, 4-cyanopyridine, 2-cyanopyridine N-oxide, 3,4-dihydroxy-3-cyclobutene-1,2-dione(squaric acid), cyanopyridine, 2,12-dimethyl-3,7,11,17-tetraazabicyclo|11.3.11|heptadeca-1(17),2,11,13,15-pentane,

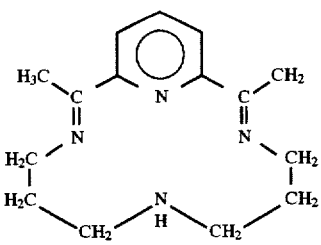

1,4,7,10-tetrazacyclododecane, dicyclohexyldithiophosphate, 2,4-dimethyl-1H-1,5-benzodiazepinium cation, 2,2'-diaminobiphenyl, 1,4-diazacylooctane-N,N'-diacetate, bis(2-aminoethyl)sulfide, 1,8-diaminopthalene, 3,3'-bis(aminopropyl)ether, o-phenylenebis(dimethylarsine), dibenzoylmethanate,

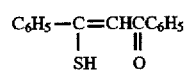

N,N'-dibenzylethylenediamine, 1,3-diphenyl-1,3-propanedione, dibutylthiourea, 4,4'-diethoxycarbonyl-3,3',5,5'-tetramethyldipyrromethane, 4,4'-dimethyldipyrromethane-3,3'-deimethyldipyrromethene, 4,4'-diethoxycarbonyl-3,3',5-tetramethyldipyrromethane, 3,5-dichloropyridine, N,N'-dicylohexylthiourea, diethyldithiocarbamate, N,N-diethylformamide, diethylmethylene diphosphonate, diethylenetriamine, N,N'-diethylthiourea, dithioxamide, 2,2-dimethylhexane-3,5-dionate, 1,4-dihydrazinophthalzaine, O-phenylenebisdimethylarsine,

N,N'-di-n-butylthiourea, diethylenetriamide, N,N-diethylethylenediamine N-oxide, diethylenetraimmonium, bis(2-dimethylaminoethyl)methylamine, N,N'-diethylthiourea, 2,3-dimethyl-1,4,8,11-tetraazacyclotetradeca-1,3-diene, N,N'-dimethylethylenediamine, N,N-dimethylethylenediamine N-oxide, N,N-dipropylethylene-diamine N-oxide N,N'-diphenylthiourea, 2,8-dimethylnonane-4,6-dione, N,N-dimethylacetamide, dimethylaminoethiolhydrochloride, N,N-dimethylbutyramide, 2,3-dimethylcyclam, 2,4-dimethylthiazole, dimethylglyoxime, 3,5-dimethylpyrazole, 3,6-dimethylpyrazine, 2,3-dimethylquinoxaline, dimethylsulfoxide, N,N-dimethylthioacetamide, 1,3-dimethyltriazene-1-oxide, N,N-dimethylthiourea, 2,7-dimethyl-1,8-napthylidine, nonane-4,6-dione, tridecane-6,8-dione, 1,5-diazanaphthalene, di-2-pyridylamine, 1,4-di(2'-pyridyl)amonophthalazine, pyridine-2,6-dicarbonic acid, 1,2-bis(diphenylphosphino)ethane, bis|2-(2-pyridyl)ethyl| amine, ethylenebis(diphenylphosphine oxide), di(2-pyridyl-β-ethyl)sulfide, N,N'-diphenyldithiomalonamide, di-2-pyridylketone, 2,2,6,6-tetramethyl-3,5-heptanedione

[(CH₃)₃CCO]₂CH₂, 3,3',4-trimethyldipyrromethenate, 3,3',4,4'-tetramethyldipyrromethenate, 2,6-dimethylpyridine N-oxide, phenyldi(2-pyridyl)amine, 3,5-di(pyrid-2-yl)pyrazole, 3,5-di(pyrid-2-yl)pyridazine, 2,3-di-(2-pyridyl)quinoxaline, dipropylenetriamine, 1,5,9-triazanoane, N,N'-diphenylthiourea, (C₂H₅O)₂PSe⁻ dithioacetylacetone, diethyldithiocarbamate, 1,4-dithiocycloheptane, 1,5-dithiacyclooctane,

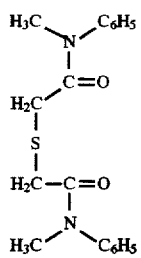

dithiobenzoate, 2,5-dithiahexane, diethyldithiophosphate (C₂H₅O)₂PS₂⁻, C₆H₅CH₂CSS⁻, diphenylglyoxime,

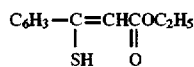

cis-1,2-bis(dimethylarsine)ethylene, ethylenediamine-N,N'-diacetate, ethylenediamine-N,N'-diacetic acid, 1,2-ethylenebisdiphenylphosphine oxide, ethylenediamine tetraacetate, 1,8-diamino-3,6-dithiacotane, ethylene glycol, 2-ethylmercaptocyclopentylamine, ethylenediamine, O-ethyl-N-allylthiocarbamate, (±)-N,N-diethyl-α-alanine, tetraethyldithioxiamide, N,N'-dihydroxyethyldithioxamide, 1,1,7,7-tetraethyldiethylenetriamine,

HN[CH₂CH₂N(C₂H₅)₂]₂,

N-ethyl ethylenediamine, N,N'-diethylethylenediamine, N,N,N'-triethylethylenediamine, N-(2-hydroxyethyl)-ethylenediamine, 2-ethylpyridine N-oxide, ethylenethiourea, ethylxanthate, o-fluoroaniline, pentalfuorobenzenethiolate, thiodiacetic acid, glicinate, glycine,

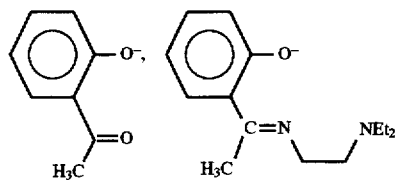

N-amidino-S-ethylthiourea hydrobromide, nicotinoylthiocarbazide, benzoylthiocarbazide, 2-hydroxybenzoylthiocarbazide, hydrazinedithiocarboxylic methyl ester, hydroxyethyethylenediaminetriacetate, 3,3',4,4',5,5=-hexamethyldipyrromethene, hexamethylenetriamine, hexafluoroacetylacetonate, N-(o-hydroxyacetophenyldene)-o-methylthioaniline, nicotinoylthiocarbazide, hydrazinedithiocarboxylate, isobutylamide, iminodiacetate, (CH₃)₂C=N—NH—CSS⁻

(CH₃)₂C=N—NH—CSSCH₃ imidazole,

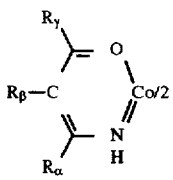

1,4-diazabicyclo[2.2.2]octane monoquaternized diamine,

[CH₃N(CH₂CH₂)₂N⁺(CH₃)₂]

N-ethyl-1,4-diazbicyclo[2.2.2]octonium cation, N-methyl-1,4-diazabicyclo[2.2.2]octonium cation, N-ethyl-N'-oxo-1,4-diazbicyclo[2.2.2]octonium cation, L-leucinemethylamide, 2,4-dimethylpyrdine N-oxide, 2,6-lutidine N-oxide, lutidine, 3,5-lutidien, malonate, 8-amino-2-methylquinoline, N-benzylethylenediamine, 2-methyl-8-[6-methyl-2-pyridyl], 1,3-dithiammonosulfoxide,

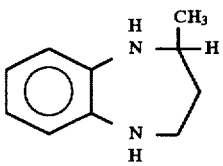

2-methylbenzothiazole, 2-methylbenzoimidazole, 3-methylcyclohexane-1,2-dione-1-oxime, bis(2-pyridylmethyl)methylamine, di(2-pyridylmethyl)methylamine, 3,6-di(6-methylpyrid-2-yl)pyridazine, N,N-dimethylethylenediamine, N,N,N'-trimethylethylenediamine, N,N,N',N'-tetramethylethylenediamine, tetrakis(2-methylimidzole), 3-methylisoquinoline, 2-methylimidazole anion, N-methylethylenediamine, N-(2'-N",N"-dimethylaminophenyl)-2-N',N'-dimethylaminobenzylideneimine, 2,2'-bis(N,N'-dimethylamino)azobenzene, N,N,N',N'-tetramethyl-o-phenylenediamine, 3-methyl-5-phenylpyrazole, 6-methyl-2-aminopyridine, 2-methylpiperidylthiocarbamate, 3-methylpiperidyldithiocarbamate, 4-methylpiperidyldithiocarbamate, 2-methylpropylenediamine, 3-methylpyrazole, 2-methylquinoline N-oxide, 4-methyl-nitrosophenol, N-methylsalicylaldiminate, tetramethyldithioxiamide, N,N'-dimethyldithioxamide, N,N,N'-trimethyltrimethylenediamine, tri(6-methyl-2-pyridylmethyl)amine, tris(2-dimethylaminoethyl)amine, methyliminodiacetate,

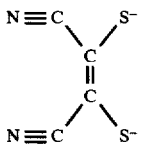

o-methoxybenzaldehyde, monoethanolamine,

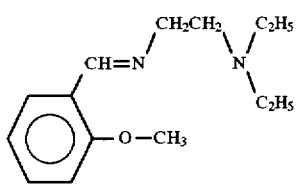

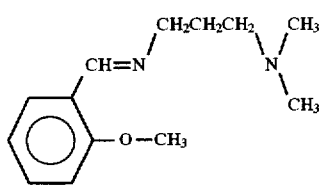

morpholine, trimorpholinophosphine oxide, methylpyrazine, 5-methyl-2-pyridyldi-(2-pyridyl)amine, 4-methyl-2-pyridyldi-(2-pyridyl)amine, 2-methyl-8-|(6-methyl-2-pyridyl)methyleneamino|-quinoline, o-methyl, N-phenylselenocarbamate, 2-methylquinoxaline,

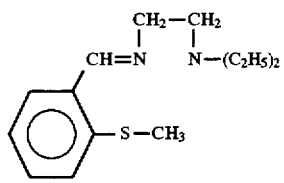

nitroacetate, N-(2-aminoethyl)morpholine, Ω-nitroacetophenone, N-(2-aminoethyl)piperazine,

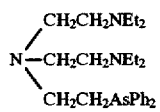

tris(2-diphenylassinoethyl)amine, n-butyramide, 3-nitrocamphorate, 2-aminobenzothiazole, nicotinic acid, N,N'-bis(salicylidene)-(–)-propylenediaminonickel(II), bis(salicylidene-γ-iminopropyl)aminonickel(II), bis(salicylidene-γ-iminopropyl)methylaminonickel(II), N-methylacetamide, N-methyl-γ-butyrolactam, N-methylformamide, N-methylimidazole, N-n-butylimidazole,

15,18-dioxa-1,5,8,12-tetraaza-2,4:9,10,13,14:19,20-tetrabenzocycloeicosane-1,11-dione,

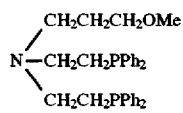

4-nitropyridine N-oxide, tris(2-diphenylphosphinoethyl)-amine,

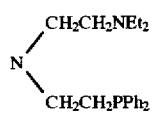

bis(2-diethylaminoethyl)-(2-diphenylphosphinoethyl)amine,

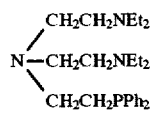

5-nitro-2-pyridyldi-(2-pyridyl)amine, 15,18-diethia-1,5,8,12-tetraaza-3,4:9,10:13,14:19,20-tetrabenzocycloeicosane-1,11-diene, 3,3'-dimethyl-1-nitrobutan-2-onate, 2,2',2"-nitrilotriethanol, 2-methoxyaniline, o-phenylenediamine, methylenebis-(diphenylphosphine oxide)oxalate, 8-hydroxyquinoline, hexaphenyl-1-1,4,7,10-tetraphosphadecane, propionamide, pyridine-4-carbaldehyde oxime, o-diphenylassinoaniline, N-(β-N',N'-dimethylaminoethyl)pyridinaldimine, 2-(dipheynlphosphinoamino)-4-methylpyridine, 2(diphenylphosphinoamino)-6-methylpyridine, N'-(2'-N', N'-dimethylaminophenyl)pyridinaldimine, pyrrole-2-carboxaldehyde, fluoroborotris(2-carboxaldoximo-6-pyridyl)phosphine, 1,4-bis(diphenylphosphino)butane, 1,5-bis(diephenylphosphino)pentane, pentachlorophenoxide, bis(o-diphenylarsinophenyl)phenylphosphine, pyridine-2,6-dicarboxylate, bis(o-dimethylaminophenyl)phenylphosphine, N,N,N',N'-tetrakis(2-aminoethyl)ethylenediamine, N-2-(2'-pyridyl)ethylpicolinamide, pentafluorophenoxide, 3-phenylacetylacetone, L-phenylalaninamide, o-phenanthroline, 1-phenyl-1,3-propanedione, picolinic acid, picolinic acid N-oxide, n-propylpicalinium, piperidine, 2,2'-(1'-pyrrolinyl)pyrrole, piperidyldithiocarbamate, 2-phenyl-1,3-dithianemonosulfoxide, 4,4'-diethoxycarbonyl-3,3',5,5=-tetramethyldipyrromethene, pentamethylene oxide, N-2-picolyl)picolinamide, pentamethylene sulfide, o-dimethylaminophenyldiphenylphosphine, 1,2-propandiamine, 1-propylenediamine, 2-(diphenylphosphinomethyl)-6-methylpyridiniumion, 2,6-bis(2-diphenylphisphinoethyl)-pyridine, heptane-3,5-dione, bis(diphenylphosphinoethyl) oxide, 2-picolylpicolinamide, 2-bis(diphenylphosphino)-methyl-6-methylpyridine, 2-|2-diphenylphosphino-1-(diphenylphosphinomethyl)-ethyl]6-methylpyridine, diisopropylidthiophosphate, N-propylethylenediamine, L-prolinamide, N-(3-hydroxypropyl)ethylenediamine, N-(2-hydroxypropyl)ethylenediamine, N-n-propylsalicylaldiminate, N,N'-bis(3-isopropylsalicylidene)polymethylenediamine, n-propylthioglycolic acid, N,N-di-n-propylthiocarbamate, P-tolumide, bis(o-diphenylarsinophenyl)-phenylarsine, tris-(o-dimethylaminophenyl)phosphine, pyridine,

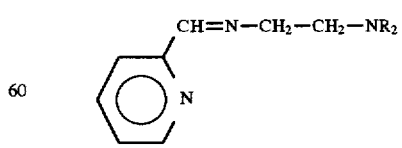

N-alkylpyridium, N,N'-bis(2-pyridylmethylene)-1,3-diaminopropane, N,N'-bis(2-pyridylmethylene)-(β)-(+)-1,3-diaminobutane, N,N'-bis(2-pyridylmethylene)-1,3-diamino-2-propanol, 2-(2'-pyridyl)benzimidazole, 2-(2-pyridyl)

imidazole, picoline, 2-picoline N-oxide, α-picoline, pyridine N-oxide, 2-(2-pyridyl)pyrrole, N-n-propylpyridium,

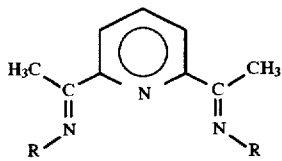

pyrazine, phenazine, pyrazole-H, quinoxaline, quinoline-2-carbaldehyde oxime, isoquinoline-3-carbaldehyde oxime, tris(o-diphenylarsinophenyl)arsine, tris(o-dimethylarsinophenyl)arsine, 4-Z-quinoline N-oxide (Z:substituent), tris(o-diphenyphosphinophenyl)phosphine, quinuclidine, quinazoline(1H,3H),-2,4-dithione, quinoline, isoquinoline, isoquinoline N-R-ethylenediamine (R: ethyl, propyl, 2-hydroxyethyl, 2-hydroxypropyl, 3-hydroxypropyl), N,N-dialkylthiocarbamates,

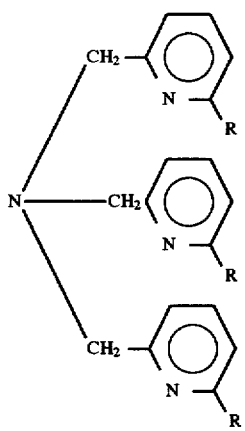

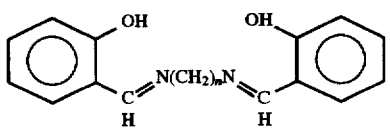

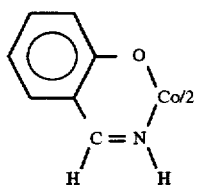

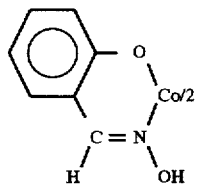

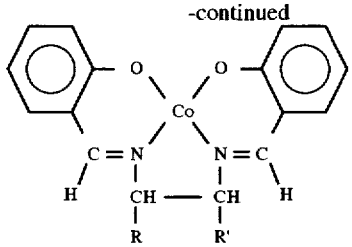

bis(salicylidene-γ-iminopropyl)amine, bis(salicyclaldehyde)ethylenediamine,

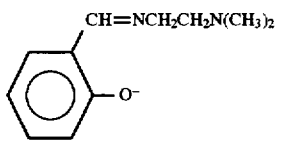

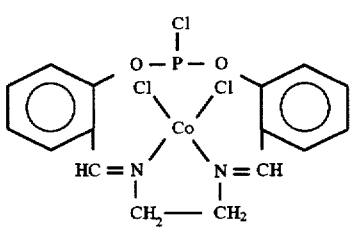

salicyclic acid, bis(salicylidene-γ-iminopropyl)-methylamine, salicylaloximate, bis(salicylaldehyde)-stilbenediiminate, N,N'-dimethylethylenediamine, 4-mercaptopent-3-en-2-one, methylenebis (diphenylphosphine)selenide, N-salicylidene-o-methylthioaniline, N,N'-bis(salicylidene)-3,3'-bis (methylthio)-benzidine, tetracyclic tertiary diamine, (-)-spartein, methylenebis-(diphenylphosphine) sulfide, stilbenediamine(1,2-diphenylethylenediamine), selenourea, (Me₂AsCH₂CH₂CH₂)₃As tetrabenzo[b,f,j,n]-[1,5,9,13]-tetraazacyclohexadecine, thioacetamide, thioacetate, triaminocyclohexane, 1,1',1"-tris (aminomethyl)ethane, tris(3-dimethylarsinopropyl)-phosphine, tartrate, bis(o-diphenylarsinophenyl)-phenylarsine, bis(o-dimethylarsinophenyl)methylarsine, tris-1,1,1-(dimethylarsinomethyl)ethane, 2,3,4,5-tetrahydro-1H-1,5-benzodiazepines, tri-n-butylphosphine oxide, thiocarbohydrazide, thiodiethanol,

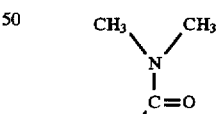

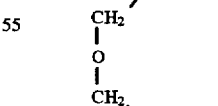

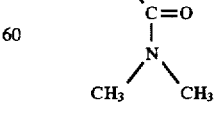

1,1,1-tris(diphenylphosphinomethyl)ethane, tris (dimethylamino)phosphine sulfide, 5,5'-thiodisalicylic acid, triethanolamine, tetraethyldithioxamide, 3,3',5,5'-tetramethyldipyrromethene, 5,7,7,12,14,14-hexamethyl-1,4,8,11-tetraazacyclotetradecane, 2,2',2"-terpyridine-1,1',1"-trioxide, 4,4-dimethyl-1,3-pentanedione, 3,7-diaza-1,9-nonanediamine, 4,7-diaza-1,10-decanediamine, C-racemic-5,7,7,12,14,14-hexamethyl-1,4,8,11-tetraazacyclotetradecane, C-mesa-5,7,7,12,14,14-hexamethyl-1,4,8,11-tetraazacyclotetradecane, 5,7,7,12,12,14,-hexamethyl-1,4,8,11-tetraazacyclotetradecane, cyclotetradecane

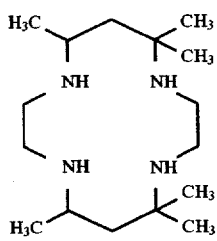

1,1,1-trifluoro-2,4-pentanedione, trifluoroacetylpicolinate, 4,4,4-trifluoro-1-phenyl-1,3-butanedione, diethylenetrithiodicetic acid

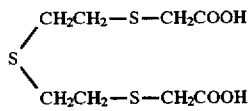

2,2,6,6-tetraemthylheptane-3,5-butanedionate, tetrahydrofuran, thiazole, thiosemicarbazide, tetrahydrothiphen, 2,3,9,10-tetramethyl-1,4,8,11-tetraazacyclotetradeca-1,3,8,10-tetraene, trimethylacetamide, N,N,N',N'-tetramethylethylenediamine, tetramethylquanidin, N,N,N',N'-tetramethylmalonamide, trimethylamine N-oxide, thiomorpholine, 1,3,5-trimethylpyrazole tetramethylene sulfide, tetramethylene sulfoxide, tetramethylene sulfone, trimethylenediamine (1,3-diaminopropane), trimethylenediamine-N,N'-diisobutyric acid amide, bis(o-diphenylphosphinophenyl) phenylphosphine, thiopropionic acid, tri-2-pyridylamine, 2,4,6-trimethylpyridine N-oxide,

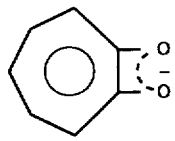

tetraphenylporphine, triphenylphosphine oxide, tris(2-dimethylaminoethyl)amine, bis(o-dimethylarsinophenyl)-methylarsine, triethylenetetramine, tri-(2-pyridyl)amine, 1,6-diethoxycarbonyl-1,2,3,4,5,6'-hexamethyltripyrrene-b, thiosemicarbazide, tris(o-methylthiophenyl()phosphine,

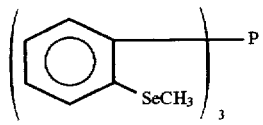

1,4,7,10-tetrathiacyclodecane, 1,5,9-trithiacyclododecane,

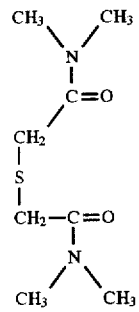

thenoyltrifluoroacetonate, 1,4,7,10-tetrathiacyclotridecane, CHP[CH$_2$CH$_2$CH$_2$P(C$_6$H$_5$)$_2$]$_2$, thiazolidine-2-thione, thiourea, 1,2,4-triazole, L-valinamide,

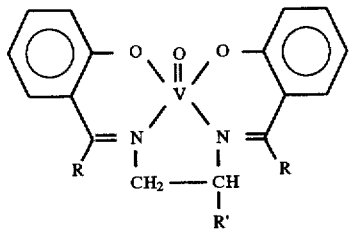

(R: CH$_3$, H)
(R': H)

3-methoxysalicyclideneiminate complex

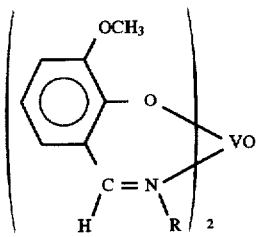

salicylidenesiminate complex

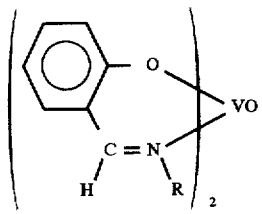

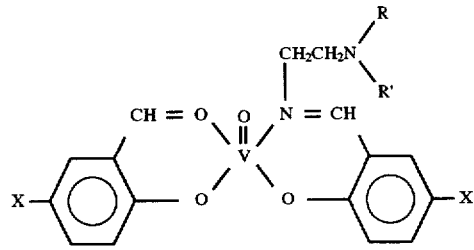

-continued

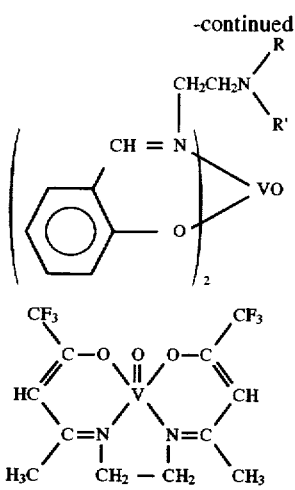

ethylenediaminetetraccetic acid, ethylenedithiodiacetic acid,

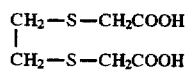

di-2-phenylenethyldithiophosphate,

As the phthalocyanine compound for use in the present invention, metal phthalocyanine and derivatives thereof can be employed. In particular, it is preferable that the phthalocyanine compound have a central metal ion with the number of the electrons in the d-orbit thereof being 0, 1, 2, 3, 4, 5, 6, 7, or 10, since such phthalocyanine compounds tend to be coordinated to the compounds having the previously mentioned donor elements.

It is preferable that the mixing ratio of the compound having the group which can be coordinated to the above-mentioned phthalocyanine compound to the phthalocyanine compound be in the range of ½ to ⅔ in terms of mole (the compound having the donor element/phthalocyanine compound). When this molar ratio is less than ½, the effect of the compound which has the donor element cannot be sufficiently obtained, while when the molar ratio is more than ⅔, the concentration of the pigment in the light absorption layer is lowered so that the absorption coefficient of the light absorption layer is decreased.

As the materials for the light absorption layer, not only the above-mentioned phthalocyanine compound, but also dyes which are conventionally employed as recording materials for conventional information recording media can be employed in the form of a mixture with the phthalocyanine compound.

Examples of such dyes include cyanine dyes, pyrylium—thiopyrylium dyes, azulenium dyes, squarylium dyes, metal complex salt dyes such as Ni and Cr complex salt dyes, napthoquinone—anthraquinone dyes, indophenol dyes, indoaniline dyes, triphenylmethane dyes, triarylmethane dyes, aminium—diinomonium dyes, and nitroso compounds.

When necessary, other third components such as a binder and a stabilizer may be contained in the light absorbing layer.

It is preferable that the light absorbing layer be formed on the substrate by applying to the substrate a coating liquid composed of a mixture of the phthalocyanine compound and the compound having the group that can be coordinated to the phthalocyanine compound.

The above coating liquid can be prepared by dissolving the above-mentioned two compounds in a solvent. It is preferable that the phthalocyanine compound be dissolved in a melted liquid of the compound having the donor element to prepare a mixture, and this mixture be dissolved in a solvent, in order to efficiently coordinate the compound having the donor element to the phthalocyanine compound.

As the solvent for the above-mentioned coating liquid, conventional organic solvents such as alcohol, cellosolve, halogeanted carbon, ketone, and ether, can be employed.

The light absorbing layer can be formed, for example, by the evaporation method, LB method, and spin coating method. Of these methods, the spin coating method is most preferable because the thickness of the light absorbing layer can be controlled as desired by controlling the concentration and viscosity of the components for the formation of the light absorbing layer, and the drying speed of the solvent used for the components for the formation of the light absorbing layer.

As the substrate for use in the present invention, any materials used for the substrate of conventional information recording media can be employed.

Specific examples of the material for the substrate for use in the present invention include acrylic resin such as polymethyl methacrylate; vinyl chloride resin such as polyvinyl chloride, and vinyl chloride copolymer; epoxy resin; polcarbonate resin; amorphous polyolefin; polyester; glass such as soda-lime glass; and ceramics.

Particularly in view of the dimensional stability, transparency, and flatness of the substrate, polymethyl methacrylate, polycaronate, epoxy resin, amorphous polyolefin, polyester, and glass are preferable as the material for the substrate for use in the present invention.

An undercoat layer may be provided between the light absorbing layer serving as recording layer and the substrate for the improvement of the flatness of the substrate, and the adhesiveness between the substrate and the light absorbing layer, and for the prevention of the deterioration of the light absorbing layer.

Examples of the material for the undercoat layer include polymers such as polymethyl methacrylate, acrylic acid—methacrylic acid copolymer, styrene—maleic anhydride copolymer, polyvinyl alcohol, N-methylolacrylamide, styrene—sulfonic acid copolymer, styrene—vinyltoluene copolymer, chlorosulfonated polyetheylene, polyester, polyimide, vinylacetate, vinyl chloride copolymer, ethylene—vinyl acetate copolymer, polyethylene, polypropylene, and polycarbonate; organic materials such as silane coupling agent; and inorganic materials such as inorgnaic oxide ($SiO_2$, $Al_2O_3$), and inorganic fluoride ($MgF_2$).

The undercoat layer can be formed by coating the substrate with a coating liquid composed of any of the above-mentioned materials and a solvent in which the material is dissolved or dispersed. This coating can be performed by the conventional coating methods such as the spin coating method, dip coating method, and extrusion coating method.

The thickness of such an undercoat layer is preferably in the range of 0.005 μm to 20 μm, more preferably in the range of 0.01 to 10 μm.

A pre-groove layer for forming therein grooves for tracking and/or address signals may be provided on the substrate or on the undercoat layer.

As the material for the pre-groove layer, a mixture of at least one monomer selected from the group consisting of monoester, diester, triester and tetraester of acrylic acid, or an oligomer thereof, and a photopolymerization initiator may be employed.

On the light absorbing layer which serves as a recording and therefore is hereinafter referred to as the recording layer, a reflection layer may be provided in order to improve the S/N ratio, reflectivity and recording sensitivity of the recording medium.

As the light reflective material for use in the reflection layer, materials having high reflectivity with respect to laser beams are employed. Examples of such materials include metals and metalloids, for examples, of Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ca, In, Si, Ge, Te, Pb, Po, Sn, and Si.

Of these metal and metalloids, Au, Al and Ag are preferable for use as the material for the reflection layer.

These materials may be used alone or in combination, or in the form of alloys.

The reflection layer can be formed on the recording layer by depositing any of the above-mentioned light reflective materials on the recording layer by evaporation, sputtering or ion-plating.

The reflection layer generally has a thickness of 100 to 3000Å.

The reflection layer may be interposed between the substrate and the recording layer. In this case, recording information and reproduction of recorded information are carried out on the side of the recording layer, which is opposite to the substrate.

A protective layer may be provided on the recording layer or the reflection layer in order to physically and chemically protect the recording layer or the reflection layer.

Such a protective layer may also be provided on the side of the substrate on which the recording layer is not provided in order to improve the resistance to scratches and the resistance to humidity of the recording medium.

As the material for the protective layer, for instance, inorganic materials such as SiO, $SiO_2$, $MgF_2$, and $SnO_2$; and resins such as thermoplastic resin, thermosetting resin, and UV curing resin can be employed.

The optical recording medium of the present invention is capable of recording information and/or reproducing recorded information therefrom by light, in particular, by use of laser beams.

Other features of this invention will become apparent in the course of the following description of exemplary embodiments, which are given for illustration of the invention and are not intended to be limiting thereof.

EXAMPLE 1

A phthalocyanine compound of the following formula (A) was dissolved in a liquid of benzimidazole which was obtained by melting benzimidazole with the application of heat thereto:

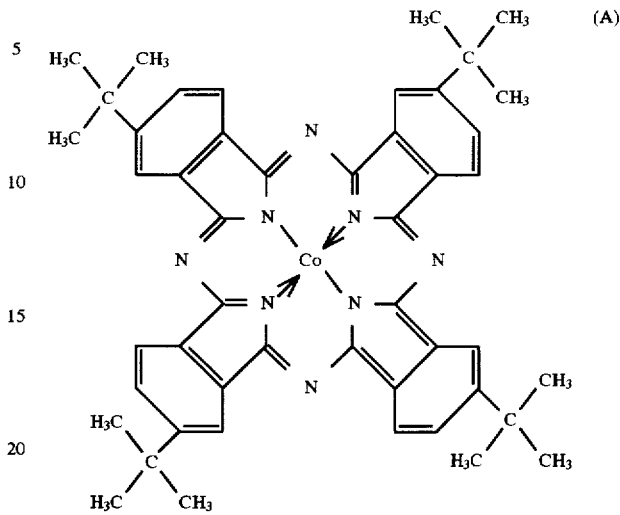

(A)

The mixture was then cooled, whereby a mixture of the phthalocyanine compound and a compound having a group which can be coordinated to the phthalocyanine compound was obtained. The mixing ratio by weight of the two compounds was 1:1.

This mixture was dissolved in chloroform to prepare a coating liquid for the formation of a light absorbing layer serving as a recording layer.

The coating liquid was coated on a disk-shaped glass substrate with a diameter of 120 mm and a thickness of 1.2 mm by spin coating, whereby a light absorbing layer was provided on the glass substrate, and an optical recording medium No. 1 of the present invention was fabricated.

Figure 2:
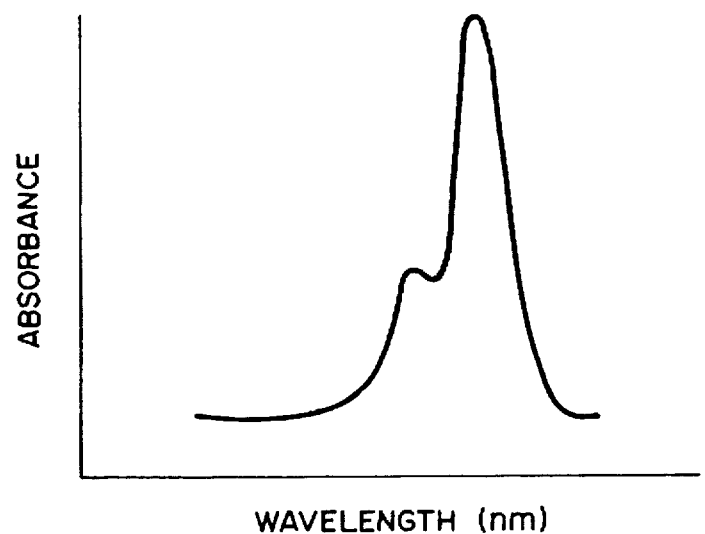
FIG. 2 is a light absorption spectrum of a phthalocyanine compound film in which the molecules thereof are not associated.

FIG. 2 shows a light absorbing spectrum of the light absorbing layer, which indicates that the absorption peak on the right side, which is a longer wavelength side, is higher than the absorption peak on the left side, which is a shorter wavelength side.

EXAMPLE 2

The procedure for fabricating the optical recording medium No. 1 of the present invention in Example 1 was repeated except that the phthalocyanine compound of formula (A) employed in Example 1 was replaced by a phthalocyanine compound of the following formula (B) and that the chloroform employed for preparing the coating liquid for the formation of the light absorbing layer in Example 1 was replaced by 1,2-dichloroethane, whereby a light absorbing layer was provided on the glass substrate, and an optical recording medium No. 2 of the present invention was fabricated:

(B)

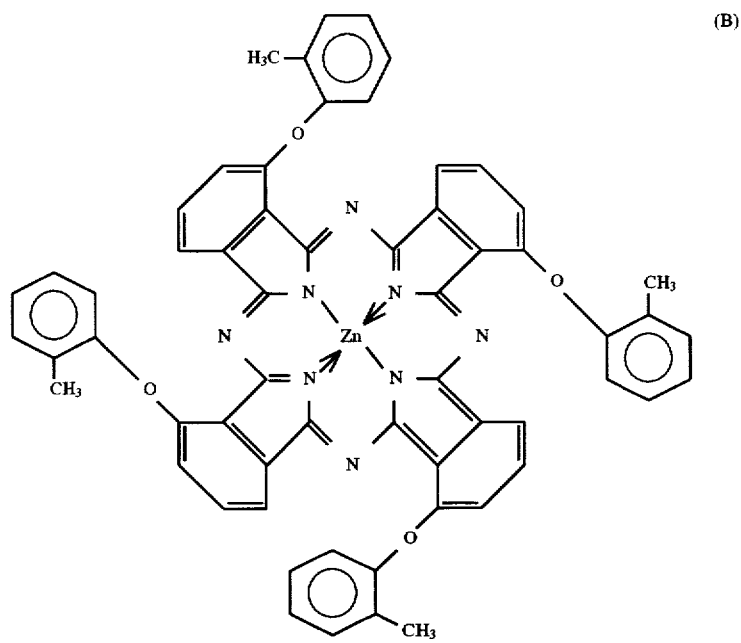

The refractive index of the light absorbing layer of the optical recording medium No. 2 of the present invention was 2.3 when a light beam with a wavelength of 790 nm was applied thereto.

Comparative Example 1

The phthalocyanine compound of formula (A) employed in Example 1 was dissolved in chloroform, whereby a coating liquid for the formation of a light absorbing layer was prepared.

This coating liquid was coated on a disk-shaped glass substrate with a diameter of 120 mn and a thickness of 1.2 mm by spin coating, whereby a light absorbing layer was provided on the glass substrate, and a comparative optical recording medium No. 1 was fabricated.

FIG. 1 shows a light absorbing spectrum of the above light absorbing layer, which indicates that the absorption peak on the left side, which is a shorter wavelength side, is higher than the absorption peak on the right side, which is a longer wavelength side.

Comparative Example 2

The phthalocyanine compound of formula (B) employed in Example 2 was dissolved in 1,2-dichloroethane, whereby a coating liquid for the formation of a light absorbing layer was prepared.

This coating liquid was coated on a disk-shaped glass substrate with a diameter of 120 mm and a thickness of 1.2 mm by spin coating, whereby a light absorbing layer was provided on the glass substrate, and a comparative optical recording medium No. 2 was fabricated.

The refractive index of the light absorbing layer of the comparative optical recording medium No. 2 was 2.1 when a light beam with a wavelength of 790 nm was applied thereto.

According to the present invention, an optical recording medium comprising a light absorbing layer serving as a recording layer with excellent light resistance and optical characteristics can be obtained.

What is claimed is:

1. An optical recording medium comprising a substrate and a light absorbing layer formed on said substrate, said light absorbing layer consisting essentially of a mixture of a phthalocyanine compound (1) containing as a central metal therefor a metal selected from the group consisting of Co and Zn and a compound (2) having a group which can be coordinated to said phthalocyanine compound (1) so that said compound (2) enters between molecules of the phthalocyanine compound (1), thereby inhibiting association of the molecules of the phthalocyanine compound (1).

2. The optical recording medium as claimed in claim 1, wherein said compound (2) is a compound having a group which contains at least one element selected from the group consisting of N, O and S.

3. The optical recording medium as claimed in claim 2, wherein said group of said compound (2) is selected from the group consisting of:

(a) $-NH_2$, (b) $\diagdown NH$, (c) $=\!\!\!>\!\!N$, (d) $\diagdown C=NOH$, (e) $\diagdown C=NH$, (f) $\diagdown C=N-$, (g) $-S-$, (h) $\diagdown C=O$, (i) $\diagdown C=S$, (j) $-O-$, (K) $-\overset{O}{\underset{\|}{C}}-O-$, (l) $-\overset{O}{\underset{\underset{\|}{O}}{\overset{\|}{P}}}-O-$, and (m) $-\overset{O}{\underset{\underset{\|}{O}}{\overset{\|}{S}}}-O-$.

4. The optical recording medium as claimed in claim 1, wherein said group of said compound (2) is selected from the group consisting of:

(a) $-NH_2$, (b) $\diagdown NH$, (c) $=\!\!\!>\!\!N$, (d) $\diagdown C=NOH$, (e) $\diagdown C=NH$, -continued

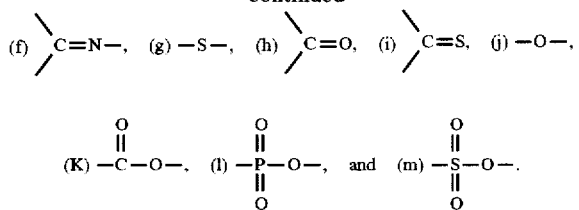

5. The optical recording medium as claimed in claim 1, wherein said compound (2) is a compound having a melting point of 150° C. or more.

6. A method of producing an optical recording medium comprising a substrate and a light absorbing layer formed on said substrate, said light absorbing layer comprising a mixture of a phthalocyanine compound (1) containing as a central metal therefor a metal selected from the group consisting of Co and Zn and a compound (2) having a group which can be coordinated to said phthalocyanine compound (1) so that said compound (2) enters between molecules of the phthalocyanine compound (1), thereby inhibiting association of the molecules of the phthalocyanine compound (1), which comprises the step of:

performing spin coating of a mixture of a melted liquid of said compound (2) and said phthalocyanine compound (1) which is dissolved in said melted liquid of said compound (2), on said substrate.

* * * * *